United States Patent
Lee et al.

(10) Patent No.: US 10,562,706 B1
(45) Date of Patent: Feb. 18, 2020

(54) STOWING WORKER USER INTERFACE

(71) Applicant: Coupang, Corp., Seoul (KR)

(72) Inventors: Gyoungseok Lee, Seoul (KR); Ji Eun Kim, Seoul (KR); Sun Young Hong, Seoul (KR); Da Young Kim, Hanam (KR); Kyungtae Kang, Seongnam (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/503,898

(22) Filed: Jul. 5, 2019

(51) Int. Cl.
| | |
|---|---|
| *B65G 1/137* | (2006.01) |
| *G06Q 10/08* | (2012.01) |
| *G06K 7/14* | (2006.01) |
| *G06K 19/06* | (2006.01) |

(52) U.S. Cl.
CPC ........ *B65G 1/1371* (2013.01); *G06K 7/146* (2013.01); *G06K 19/06028* (2013.01); *G06Q 10/087* (2013.01)

(58) Field of Classification Search
CPC .................................................. G06Q 10/08
See application file for complete search history.

(56) References Cited

U.S. PATENT DOCUMENTS

| | | | | |
|---|---|---|---|---|
| 2014/0297555 | A1* | 10/2014 | Kawano | G06Q 10/0837 705/340 |
| 2015/0073587 | A1* | 3/2015 | Vliet | B65B 59/00 700/216 |
| 2018/0268348 | A1* | 9/2018 | Guan | G06Q 10/08 |

* cited by examiner

*Primary Examiner* — A. Hunter Wilder
(74) *Attorney, Agent, or Firm* — Finnegan, Henderson, Farabow, Garrett & Dunner LLP

(57) ABSTRACT

The present disclosure provides systems and methods for stowing products, comprising a memory storing instructions and a processor configured to execute the instructions to receive a tote identifier associated with a tote containing at least one product for stowing, predict, based on the tote identifier, a location for stowing the product, and provide a location recommendation for stowing the product based on the predicted location. The processor is configured to receive a product identifier, a location identifier, and a quantity of the product to be stowed. The processor is configured to modify a database to assign the location identifier and the quantity to the product identifier, receive a notification of a stowing error associated with the tote identifier, modify the database to assign the stowing error to the tote identifier, and automatically report the stowing error.

6 Claims, 12 Drawing Sheets

| Database 304 ||||||||||| |
|---|---|---|---|---|---|---|---|---|---|---|
| # | Timestamp | Tote Identifier | Product Identifier | Inbound Quantity | Stowing Error | Physical Quantity | Expected Quantity | Stowing Error Status | Incorrect Product Quantity | Damage Quantity | ... |
| 1 | yyyy-mm-dd hh:mm:ss | 14-ABCDEF-1-10 | 12345678 | 100 | Shortage | 0 | 100 | Reported | 0 | 0 | ... |
| 2 | yyyy-mm-dd hh:mm:ss | 14-ABCDEF-1-12 | 13584438 | 100 | Overage | 100 | 0 | Resolved | 0 | 25 | ... |
| 3 | yyyy-mm-dd hh:mm:ss | 14-ABCDEF-1-24 | 13589543 | 1100 | Shortage | 1 | 1097 | Resolved | 0 | 0 | ... |
| 4 | yyyy-mm-dd hh:mm:ss | 14-ABCDEF-1-26 | 56487633 | 1900 | Shortage | 0 | 1900 | Resolved | 0 | 0 | ... |
| 5 | yyyy-mm-dd hh:mm:ss | 14-ABCDEF-1-27 | 65449623 | 110 | Shortage | 50 | 111 | Reported | 0 | 0 | ... |
| 6 | yyyy-mm-dd hh:mm:ss | 14-ABCDEF-1-51 | 55698324 | 100 | Overage | 100 | 0 | Reported | 100 | 0 | ... |
| 7 | yyyy-mm-dd hh:mm:ss | 14-ABCDEF-1-83 | 124685896 | 100 | Overage | 100 | 0 | Tote Modified | 10 | 20 | ... |
| 8 | yyyy-mm-dd hh:mm:ss | 14-ABCDEF-1-87 | 468236415 | 100 | Shortage | 0 | 100 | Reported | 0 | 0 | ... |
| ... | ... | ... | ... | ... | ... | ... | ... | ... | ... | ... | ... |

FIG. 6

STOWING WORKER USER INTERFACE

TECHNICAL FIELD

The present disclosure generally relates to computerized systems and methods for stowing products. In particular, embodiments of the present disclosure relate to inventive and unconventional systems related to stowing products by predicting locations within a fulfillment center to stow the products and automatically reporting any stowing errors associated with the products.

BACKGROUND

Various systems and methods exist for stowing inbound products and reporting any errors that may arise while stowing the inbound products. For example, as inbound products arrive at fulfillment centers, stowing workers manually scan identifiers associated with the products, such as stocking keeping units (SKUs) and manually fill out reports for each error, such as product damage, barcode damage, incorrect products, or the like. Then, the stowing workers gather the inbound products with errors and deliver these products back to the manufacturers for reshipment. While these conventional systems and methods may be effective in reporting stowing errors, there has yet to be an efficient method for stowing products that efficiently provides location recommendation for stowing the products once the products are scanned and automatically reports any stowing errors to be resolved.

Errors that arise during stowing inbound products can significantly delay the shipment and delivery of products to customers. As one example, stowing workers may make mistakes in calculating the quantity of inbound products and, as such, physical quantity of a certain product may be different from the expected quantity of the product. Moreover, stowing errors may also arise at the manufacturers. For example, the manufacturers may make mistakes when sending inbound products to fulfillment centers for stowing. For example, manufacturers may send less than an expected quantity of a certain product. As such, when the stowing worker is stowing the product in a fulfillment center, the physical quantity of the product may not match the expected quantity of the product. Since errors that arise during stowing inbound products are inevitable, it is crucial that the stowing errors are reported and resolved quickly and efficiently in order to reduce delays in shipment and delivery of products to customers.

In addition, conventional systems and methods for stowing inbound products stow products in fixed locations within a fulfillment center. For example, conventional systems and methods may be configured to designate different types of products to a predetermined location within the fulfillment center for stowing. Furthermore, based on certain restriction rules, conventional systems and methods may determine a location within the fulfillment center for stowing products. By way of example, based on the restrictions rules, all products with the same SKU may need to be placed in a fixed location within the fulfillment center, and all products with the same expiration date may need to be placed in another fixed location within the fulfillment center. While providing a fixed location for stowing each product may be helpful in organizing the inbound products within the fulfillment center, this may significantly delay the shipment and delivery of products to customers. Especially for large companies, fulfillment centers and warehouses may be extremely large, and thus, it may take increase the time it takes to stow each product in its fixed location within the fulfillment center.

Therefore, there is a need for improved systems and methods for stowing products. In particular, there is a need for improved systems and methods for stowing products that is capable of predicting a location within the fulfillment center for stowing inbound products when an identifier is scanned. In addition, there is a need for improved systems and methods for stowing products that receives notifications of stowing errors associated with an inbound product and automatically reports stowing errors to be resolved to a remote device.

SUMMARY

One aspect of the present disclosure is directed to a computer-implemented system for stowing products. The system may comprise a memory storing instructions and at least one processor configured to execute the instructions. The at least one processor may be configured to execute the instructions to receive, from a user device associated with a user, a tote identifier associated with a tote containing at least one product for stowing, predict, based on the tote identifier, a location for stowing the at least one product contained in the tote, provide, to the user device, a location recommendation for stowing the at least one product contained in the tote based on the predicted location, receive, from the user device, a product identifier associated with the at least one product, a location identifier associated with a position at which the at least one product is to be stowed, and a quantity of the at least one product to be stowed, and modify a database to assign the location identifier and the quantity to the product identifier. The at least one processor may be configured to execute the instructions to receive, from the user device, a notification of a stowing error associated with the tote identifier, modify a database to assign the stowing error to the tote identifier, and automatically report the stowing error to a remote device.

In some embodiments, the product identifier associated with the at least one product may comprise a stock keeping unit (SKU) associated with the at least one product. In some embodiments, predicting the location for stowing the at least one product contained in the tote may comprise determining a location of the user device, determining empty locations within a fulfillment center capable of receiving the at least one product, and selecting, among the empty locations, an empty location closest to the location of the user device as the location for stowing the at least one product. In some embodiments, when the tote identifier is scanned, the at least one processor is further configured to execute the instructions to send a cause of the stowing error for display to the user device.

In some embodiments, the stowing error may comprise at least one of an overage or a shortage. When a physical quantity of the at least one product is less than an expected quantity of the at least one product, the stowing error may comprise shortage. When a physical quantity of the at least one product is greater than an expected quantity of the at least one product, the stowing error may comprise overage. When the stowing error comprises overage, the at least one processor may be configured to execute the instructions to determine a cause for the overage, the cause for the overage comprising at least one of a product damage, a barcode damage, or an incorrect product. When the stowing error comprises shortage, the at least one processor may be configured to execute the instructions to request, via the user device, a difference between the physical quantity of the at least one product and the expected quantity of the at least one product, and store the difference in the database. When the cause for the overage comprises at least one of the product damage or the barcode damage, the at least one processor is further configured to execute the instructions to provide, via the user device, a location recommendation for transferring at least one product with at least one of the product damage or the barcode damage.

Another aspect of the present disclosure is directed to a computer-implemented method for stowing products. The method may comprise receiving, from a user device associated with a user, a tote identifier associated with a tote containing at least one product for stowing, predicting, based on the tote identifier, a location for stowing the at least one product contained in the tote, providing, to the user device, a location recommendation for stowing the at least one product contained in the tote based on the predicted location, receiving, from the user device, a product identifier associated with the at least one product, a location identifier associated with a position at which the at least one product is to be stowed, and a quantity of the at least one product to be stowed, and modifying a database to assign the location identifier and the quantity to the product identifier. The method may also comprise receiving, from the user device, a notification of a stowing error associated with the tote identifier, modifying a database to assign the stowing error to the tote identifier, and automatically reporting the stowing error to a remote device.

In some embodiments, predicting the location for stowing the at least one product contained in the tote may comprise determining a location of the user device, determining empty locations within a fulfillment center capable of receiving the at least one product, and selecting, among the determined empty locations, an empty location closest to the location of the user device as the location for stowing the at least one product. The method may further comprise sending a cause of the stowing error for display displaying to the user device.

In some embodiments, the stowing error may comprise at least one of an overage or a shortage. When a physical quantity of the at least one product is less than an expected quantity of the at least one product, the stowing error may comprise shortage. When a physical quantity of the at least one product is greater than an expected quantity of the at least one product, the stowing error may comprise overage. When the stowing error comprises overage, the method may further comprise determining a cause for the overage, the cause for the overage comprising at least one of a product damage, a barcode damage, or an incorrect product. When the stowing error comprises shortage, the method may further comprise requesting, via the user device, a difference between the physical quantity of the at least one product and the expected quantity of the at least one product, and storing the difference in the database. When the cause for the overage comprises at least one of the product damage or the barcode damage, the method may further comprise providing, via the user device, a location recommendation for transferring at least one product with at least one of the product damage or the barcode damage.

Yet another aspect of the present disclosure is directed to a computer-implemented system for stowing products. The system may comprise a memory storing instructions and at least one processor configured to execute the instructions. The at least one processor may be configured to execute the instructions to receive, from a user device associated with a user, a tote identifier associated with a tote containing at least one product for stowing, predict, based on the tote identifier, a location for stowing the at least one product contained in the tote, provide, to the user device, a location recommendation for stowing the at least one product contained in the tote based on the predicted location, receive, from the user device, a product identifier associated with the at least one product, a location identifier associated with a position at which the at least one product is to be stowed, and a quantity of the at least one product to be stowed, and modify a database to assign the location identifier and the quantity to the product identifier. The at least one processor may be configured to execute the instructions to receive, from the user device, a notification of a stowing error associated with the tote identifier, modify a database to assign the stowing error to the tote identifier, and automatically report the stowing error to a remote device.

In some embodiments, predicting the location for stowing the at least one product contained in the tote may comprise determining a location of the user device, determining empty locations within a fulfillment center that is capable of receiving the at least one product, and selecting, among the determined empty locations, an empty location closest to the location of the user device as the location for stowing the at least one product. In some embodiments, the stowing error may comprise at least one of an overage or a shortage. When the stowing error comprises overage, the at least one processor may be configured to execute the instructions to determine a cause for the overage, the cause for the overage comprising at least one of a product damage or a barcode damage, and provide, via the user device, a location recommendation for transferring at least one product with at least one of the product damage or the barcode damage. When the stowing error comprises shortage, the at least one processor may be configured to execute the instructions to request, via the user device, a difference between the physical quantity of the at least one product and the expected quantity of the at least one product, and store the difference in the database.

Other systems, methods, and computer-readable media are also discussed herein.

BRIEF DESCRIPTION OF THE DRAWINGS

FIG. 6 is an exemplary database configured to store information associated with products for stowing, consistent with the disclosed embodiments.

DETAILED DESCRIPTION

Figure 1A:
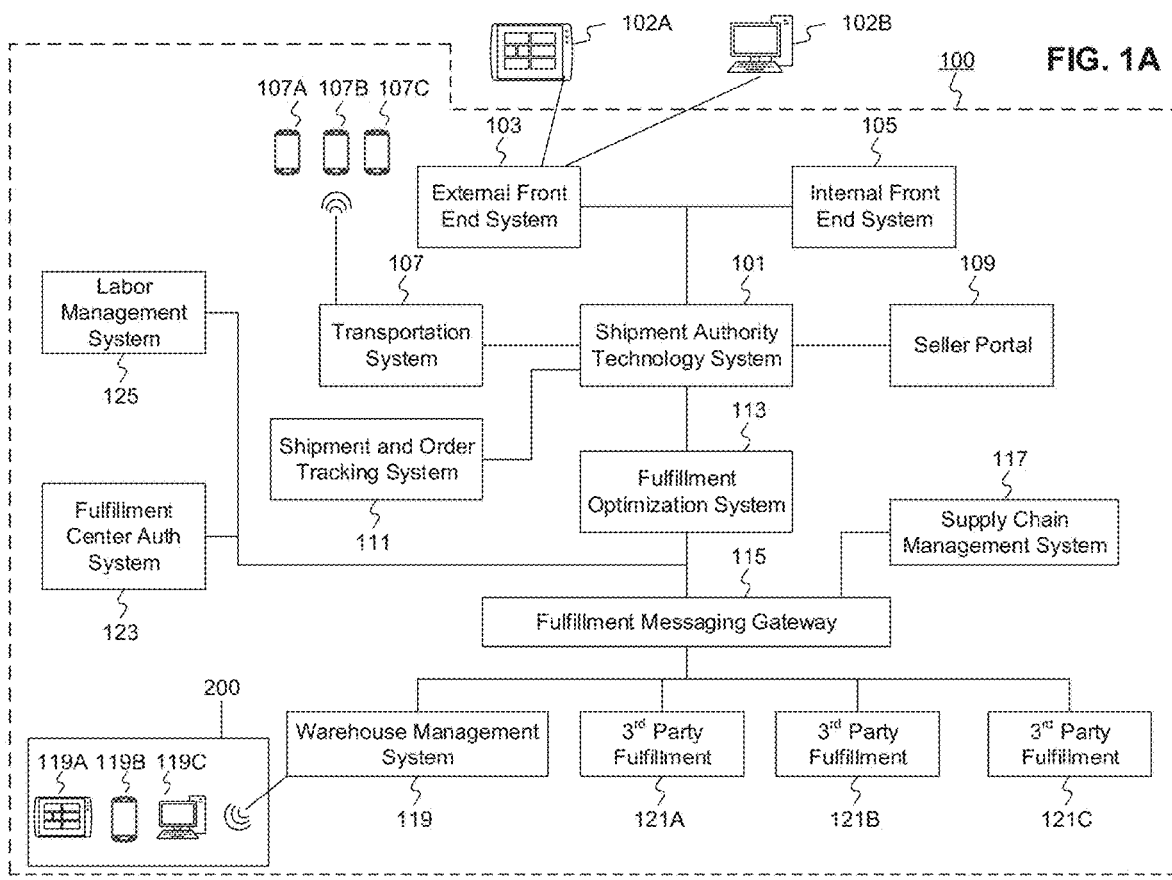
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for stowing inbound products and reporting stowing errors.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
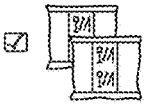
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
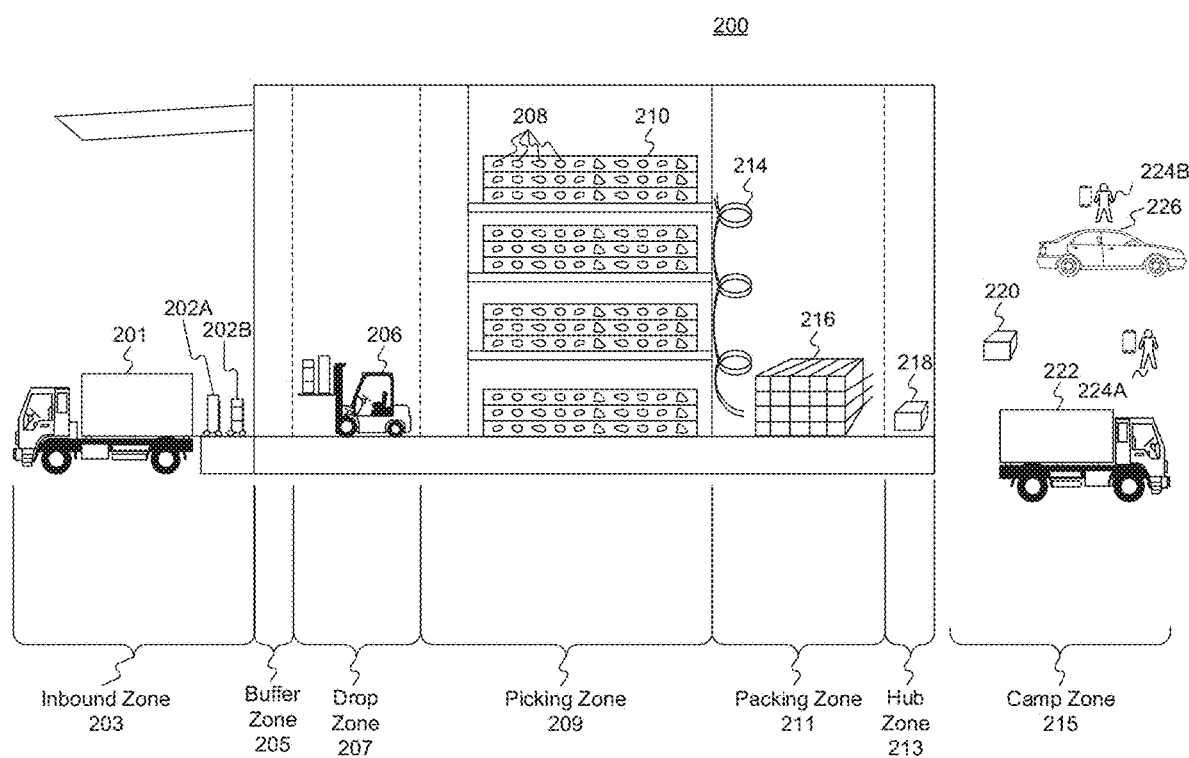
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
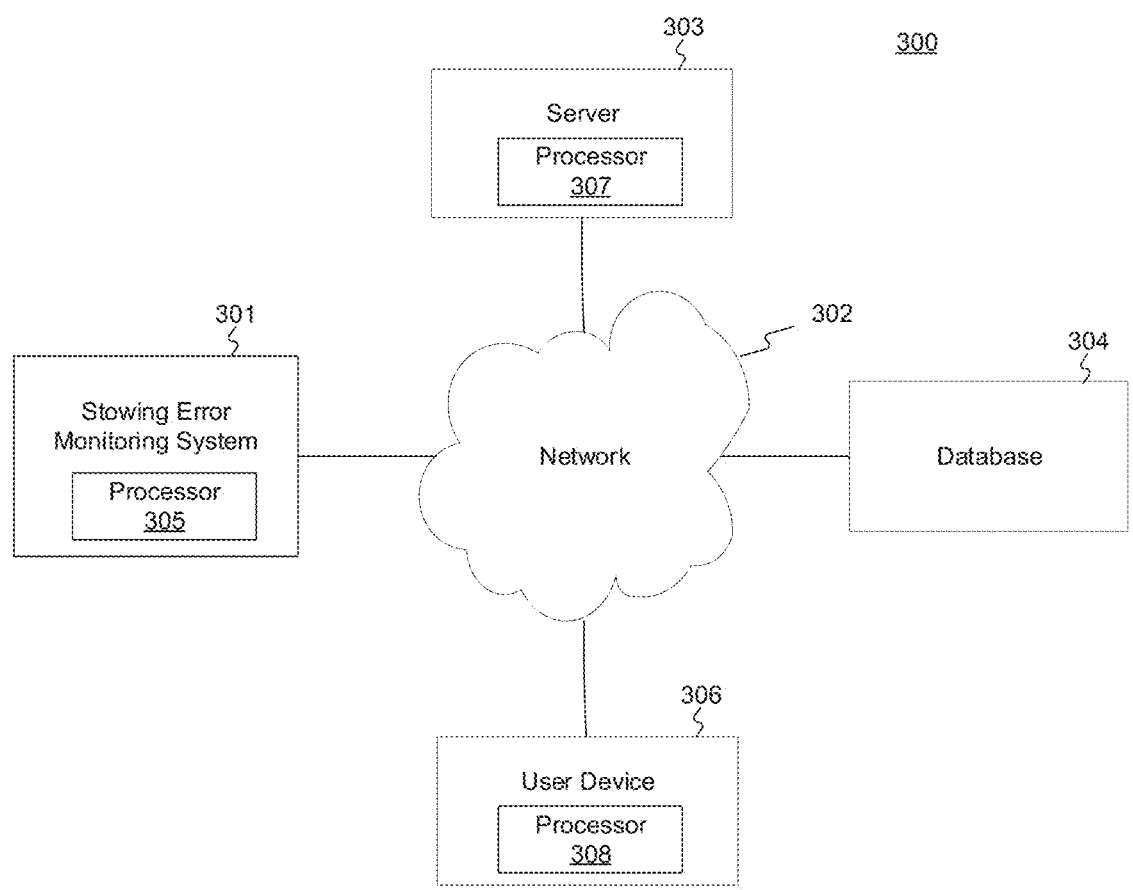
FIG. 3 is a schematic block diagram illustrating an exemplary embodiment of a system comprising a stowing error monitoring system for stowing products, consistent with the disclosed embodiments.

Referring to FIG. 3, a schematic block diagram 300 illustrating an exemplary embodiment of a system comprising a stowing error monitoring system 301 for stowing inbound products. Stowing error monitoring system 301 may be associated with one or more systems in system 100 of FIG. 1A. For example, stowing error monitoring system 301 may be implemented as part of the warehouse management system 119. Stowing error monitoring system 301, in some embodiments, may be implemented as a computer system that receives and stores notifications of stowing errors associated with one or more inbound products, resolves stowing errors, and modifies a database, such as database 304, to store information associated with the stowing errors. For example, stowing error monitoring system 301 may include one or more processors 305, which may receive a notification of a stowing error associated with a tote identifier of a tote containing an inbound product. One or more processors 305 may be configured to modify a database, such as database 304, to assign the stowing error to the tote identifier. By way of example, database 304 may store an inventory of every inbound product with a stowing error. Database 304 may further store other information associated with each inbound product, including but not limited to product identifier associated with each product, inbound quantity of each product, location identifier associated with each product, stowing error associated with each product, physical quantity and expected quantity of each product, and details associated with the stowing error. Database 304 may include one or more memory devices that store information and are accessed through network 302. By way of example, database 304 may include Oracle™ databases, Sybase™ databases, or other relational databases or non-relational databases, such as Hadoop sequence files, HBase, or Cassandra. While database 304 is illustrated as being included in the system 300, it may alternatively be located remotely from system 300. In other embodiments, database 304 may be incorporated into stowing error monitoring system 301, server 303, and/or user device 306. Database 304 may include computing components (e.g., database management system, database server, etc.) configured to receive and process requests for data stored in memory devices of database 304 and to provide data from database 304.

In some embodiments, one or more processors 305 may receive a notification of a stowing error associated with a tote identifier of a tote containing an inbound product from a server 303, via network 302. After receiving the notification of the stowing error, one or more processors 305 may modify database 304 to assign the stowing error to the associated tote identifier. As such, when the tote identifier associated with a tote containing the inbound product is scanned, for example by a remote device (not shown) in stowing error monitoring system 301, one or more processors 305 may send the stowing error, and its related information, for display to user device 306.

System 300 may also comprise a network 302 and a server 303. Stowing error monitoring system 301, server 303, user device 306, and database 304 may be connected and be able to communicate with each other via network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Server 303 may be a web server. Server 303, for example, may include hardware (e.g., one or more computers, including processors, storage, and input/output devices) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

In some embodiments, server 303 may comprise one or more processors 307 configured to receive a notification of a stowing error associated with an inbound product from user device 306, via network 302. Once one or more processors 307 receives the notification of the stowing error, one or more processors 307 may modify database 304 to assign the stowing error to a tote identifier associated with a tote containing the inbound product. One or more processors 307 may also be configured to automatically report the stowing error to the stowing error monitoring system 301. Additionally or alternatively, one or more processors 307 may automatically report the notification of the stowing error upon receiving the notification of the stowing error from user device 306, and the stowing error monitoring system 301 may be configured to modify database 304 to assign the stowing error to the tote identifier.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other.

User device 306 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 306 may also be a tablet computer. Non-limiting examples of a tablet computer include an iPad, Kindle Fire, Playbook, Touchpad, and the like. User device 306 may be associated with a user having one or more accounts. For example, a user may download an application, such as a stowing app 400 in FIGS. 4A-4C, to user device 306. As discussed in more detail below, stowing app 400 may provide a graphical user interface (GUI) to access services provided by one or more processors 307 of server 303 and/or one or more processors 305 of stowing error monitoring system 301. The services, for example, may include an account profile. User device 306 may be configured to access the account profile associated with the user. When the user first launches stowing app 400 on user device 306, stowing app 400 may prompt the user to either create an account profile or log-in to an account profile. User device 306 may comprise one or more processors 308 that may be configured to create an account profile in response to input from the user and store the account of the user in database 304, via network 302. Additionally or alternatively, one or more processors 308 may be configured to log-in to an account profile of the user in response to input from the user, e.g., in response to receiving username and password from the user. Once one or more processors 308 successfully logs in to the account profile of the user, one or more processors 308 may grant access to the account profile to the user of user device 306. For example, one or more processors 308 may display stowing app 400 on the user device 306.

Figure 4A:
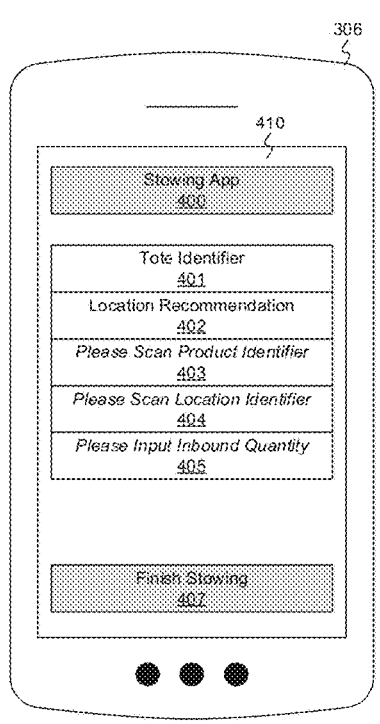
FIG. 4A is a diagrammatic illustration of an exemplary graphical user interface on a user device configured to facilitate stowing products, consistent with the disclosed embodiments.
Figure 4B:
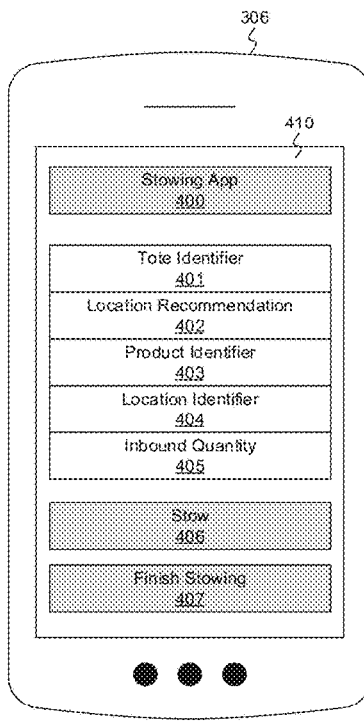
FIG. 4B is another diagrammatic illustration of the exemplary graphical user interface of FIG. 4A, consistent with the disclosed embodiments.
Figure 4C:
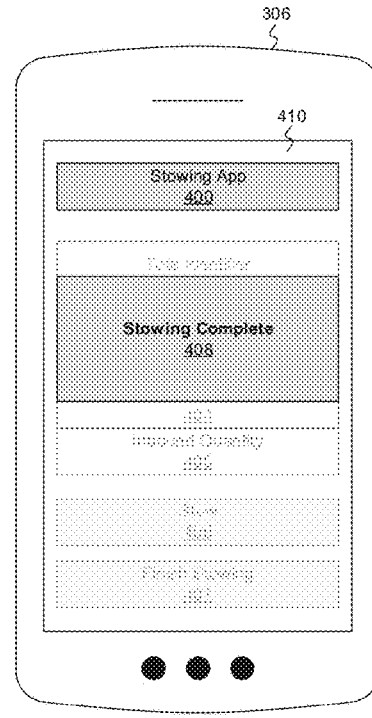
FIG. 4C is another diagrammatic illustration of the exemplary graphical user interface of FIG. 4A, consistent with the disclosed embodiments.

FIGS. 4A-4C depict exemplary embodiments of graphical user interfaces (GUIs) 410 that may be presented to the user on user device 306 via stowing app 400. In particular, FIG. 4A shows an example embodiment of an interface 410 on user device 306 configured to display one or more inputs from the user. For example, interface 410 of the stowing app 400 may be configured to receive a tote identifier 401, a product identifier 403, a location identifier 404, and/or an inbound quantity 405 associated with an inbound product. One or more processors 308 of user device 306 may be configured to receive a tote identifier 401 and send the tote identifier 401 to server 303 via network 302. For example, a user may scan a tote identifier using user device 306, and one or more processors 308 may automatically display the scanned tote identifier 401 on the interface 410.

Based on the tote identifier 401, one or more processors 307 of server 303 may predict a location for stowing at least one product contained in the tote. A location may be a location within FC 200 for stowing the at least one product contained in the tote. By way of example, one or more processors 307 may determine a location of user device 306 and determine one or more empty locations within FC 200 that are capable of receiving and stowing the at least one product. Among the one or more empty locations within FC 200 determined, one or more processors 307 may select an empty location closest to the location of user device 306 as the location for stowing the at least one product. Additionally or alternatively, one or more processors 307 may predict a location for stowing the at least one product based on one or more restrictions within FC 200. For example, each location for stowing products in FC 200 may be different in size. As such, one or more processors 307 may select a location, among the empty locations within FC 200, that is both closest to the location of user device 306 and has a size limit that is capable of stowing the at least one product. In some embodiments, every product that needs to be maintained at a particular temperature (e.g., refrigerated or frozen) may need to be placed at a particular location within FC 200. Therefore, one or more processors 307 may select a location, among the empty locations within FC 200, that is closest to the location of user device 306 and is capable of maintaining a predetermined temperature of the at least one product. One or more processors 307 may provide the location recommendation to one or more processors 308 of user device 306 such that one or more processors 308 may display location recommendation 402 on the interface 410. As sch, one or more processors 308 may be configured to display location recommendation 402 for stowing the at least one product on interface 410 upon receiving the tote identifier 401.

Referring now to FIG. 4B, once the at least one product is stowed within FC 200, the user may input a product identifier 403, location identifier 404, and/or inbound quantity 405 of the at least one product using interface 410. Product identifier 403 may include a combination of numbers, letters, and/or special characters to identify a product. For example, product identifier 403 may include a stock keeping unit (SKU) associated with the product. Location identifier 404 may include a combination of numbers, letters, and/or special characters to identify a position at which a product is to be stowed. For example, each location within FC 200 for stowing an inbound product may be assigned an identifier, such as location identifier 404. One or more processors 308 may be configured to receive and transmit product identifier 403, location identifier 404, and/or inbound quantity 405 of the at least one product to one or more processors 307 of server 303. One or more processors 307 may be configured to modify database 304 to assign location identifier 404 and inbound quantity 405 to product identifier 403. Additionally or alternatively, one or more processors 308 of user device 306 may be configured to modify database 304 to assign location identifier 404 and inbound quantity 405 to product identifier 403.

After inputting information associated with the at least one product to be stowed, the user may stow the at least one product by touching the stow button 406. Once the user touches the stow button 406, one or more processors 308 may be configured to determine that the at least one product is ready for stowing and stow the at least one product. As seen in FIG. 4C, upon stowing the at least one product, one or more processors 308 may display a notification 408 on interface 410 indicating that stowing is complete. One or more processors 308 may also send a notification to server 303 and/or stowing error monitoring system 301 indicating that stowing of the at least one product is complete. In some embodiments, one or more processors 308 of user device 306 and/or one or more processors 307 of server 303 may be configured to modify database 304 to assign a status to the product identifier 403 indicating that stowing is complete. In some embodiments, the user may return to interface 410 in FIG. 4A to continue stowing remaining inbound products in remaining totes. If the user has finished stowing inbound products, the user may touch button 407 to finish stowing. Once the user touches button 407, one or more processors 308 may cause the stowing app 400 to exit from interface 410. In other embodiments, as will be discussed in reference to FIGS. 5A-5C, once the user touches button 407, one or more processors 308 may display an interface, such as interface 510 of FIGS. 5A-5C, configured to allow the user to input any stowing error.

Figure 5A:
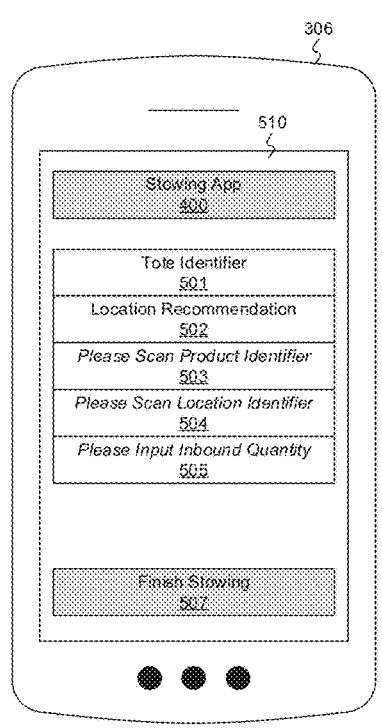
FIG. 5A is a diagrammatic illustration of another exemplary graphical user interface on a user device configured to facilitate reporting a stowing error, consistent with the disclosed embodiments.
Figure 5B:
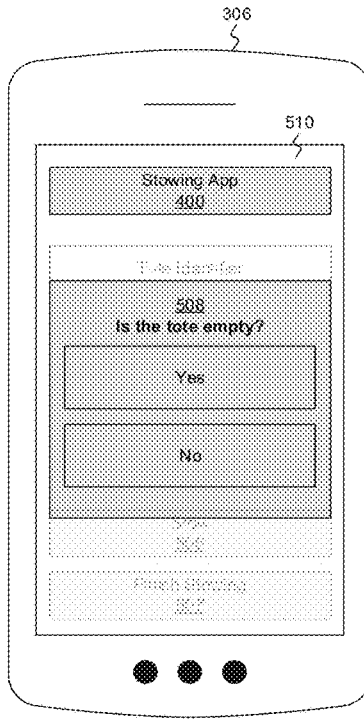
FIG. 5B is another diagrammatic illustration of the exemplary graphical user interface of FIG. 5A, consistent with the disclosed embodiments.
Figure 5C:
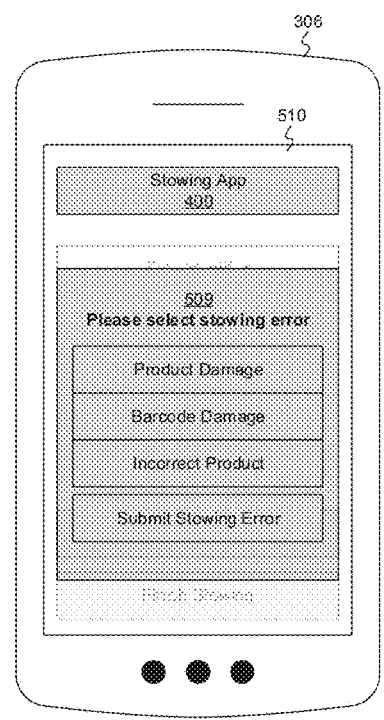
FIG. 5C is another diagrammatic illustration of the exemplary graphical user interface of FIG. 5A, consistent with the disclosed embodiments.

FIGS. 5A-5C depict exemplary embodiments of GUIs 510 that may be presented to the user on user device 306 via stowing app 500. Stowing app 500 may be the same as stowing app 400 in FIGS. 4A-4C. In particular, FIG. 5A shows an example embodiment of an interface 510 on user device 306 configured to display one or more inputs from the user. For example, interface 510 of the stowing app 500 may be configured to receive a tote identifier 501, a product identifier 503, a location identifier 504, and/or an inbound quantity 505 associated with an inbound product. One or more processors 308 of user device 306 may be configured to receive a tote identifier 501 and send the tote identifier 501 to server 303 via network 302. For example, a user may scan a tote identifier 501 using user device 306, and one or more processors 308 may automatically display the scanned tote identifier 501 on the interface 510.

Based on the tote identifier 501, one or more processors 307 of server 303 may predict a location for stowing at least one product contained in the tote. A location may be a location within FC 200 for stowing the at least one product contained in the tote. By way of example, one or more processors 307 may determine a location of user device 306 and determine one or more empty locations within FC 200 that are capable of receiving and stowing the at least one product. Among the one or more determined empty locations within FC 200, one or more processors 307 may select an empty location closest to the location of user device 306 as the location for stowing the at least one product. One or more processors 307 may provide the location recommendation to one or more processors 308 of user device 306 such that one or more processors 308 may display location recommendation 502 on the interface 510. As sch, one or more processors 308 may be configured to display location recommendation 502 for stowing the at least one product on interface 510 upon receiving the tote identifier 501.

As discussed above with reference to FIG. 4B, the user may also input product identifier 503, location identifier 504, and/or inbound quantity 505 associated with at least one product contained in the tote in order to complete stowing the at least one product within FC 200. Once the user has finished stowing, the user may touch button 507 in order to finish stowing. Before finishing stowing, one or more processors 308 of user device 306 may display a prompt to the user such that the user may report any stowing error, if necessary.

By way of example, referring to FIG. 5B, when the user touches button 507 to finish stowing, one or more processors 308 may display a prompt 508 to the user via interface 510, requesting that the user confirm whether the tote is empty. If the tote is empty, the user may press "Yes" in prompt 508. If the tote is not empty and the user has finished stowing the products, the user may press "No," indicating that there is at least one remaining product in the tote with a stowing error. For example, there may be at least one remaining product in the tote that cannot be stowed for a particular reason.

As seen in FIG. 5C, if the user presses "No" in prompt 508, one or more processors 308 may display another prompt 509 requesting that the user select a cause for the stowing error. A cause for the stowing error may include, but is not limited to, product damage, barcode damage, or incorrect product. For example, if an inbound product is damaged and cannot be stowed for purchase by a customer, the user may select "Product Damage" button in prompt 509. If an inbound product has a damaged barcode that cannot be scanned properly, the user may select "Barcode Damage" button in prompt 509. If an inbound product is missing from the inventory and should not be stowed for purchase by a customer, the user may select "Incorrect Product" button in prompt 509. Once the user selects a cause for the stowing error in prompt 509, the user may press "Submit Stowing Error" button in prompt 509, after which one or more processors 308 may cause the stowing app 500 to exit from interface 510.

In some embodiments, one or more processors 308 may modify database 304 to assign the stowing error and/or the cause of the stowing error to the tote identifier. In other embodiments, one or more processors 308 may transmit the stowing error and/or the cause of the stowing error to one or more processors 307 of server 303 and/or one or more processors 305 of stowing error monitoring system 301. Then, one or more processors 307 of server 303 and/or one or more processors 305 of stowing error monitoring system 301 may modify database 304 to assign the stowing error and/or the cause of the stowing error to the tote identifier. As such, when stowing error monitoring system 301 receives a notification of a stowing error, the cause of the stowing error stored in database 304 can be determined by looking up or scanning the tote identifier.

FIG. 6 shows information associated with the inbound products that may be stored in a table of exemplary database 304. As discussed above, one or more processors 308 or user device 306, one or more processors 307 of server 303, and/or one or more processors 305 of stowing error monitoring system 301 may be configured to modify database 304 to store information associated with inbound products. By way of example, when totes containing inbound products arrive at FC 200 for stowing, one or more processors 307 of server 303 may receive tote identifiers, such as tote identifiers 401 or 501 associated with the totes containing the inbound products for stowing. One or more processors 307 may receive tote identifiers, from user device 306, when a user scans the tote identifiers, using user device 306, and store the tote identifiers in database 304. One or more processors 307 may also store a timestamp, representing a time at which each tote identifier is received from user device 306. As such, database 304 may maintain an updated record of the time, at which each tote containing inbound products are received at FC 200. In some embodiments, one or more processors 307 may be configured to store an inventory of every inbound product contained in each tote. For example, when one or more processors 307 receives a product identifier, such as product identifier 403 or 503, associated with at least one inbound product, one or more processors 307 may be configured to assign the product identifier to a tote identifier associated with a tote containing the product in database 304. The product identifier may include, for example, a stock keeping unit (SKU) associated with the product. One or more processors 307 may also be configured to store an inbound quantity, such as inbound quantity 405 or 505, of each inbound product in database 304. For example, one or more processors 307 may determine an inbound quantity of a product contained in a tote. One or more processors 307, then, may modify database 304 to assign the inbound quantity to the product identifier associated with the product and the tote identifier associated with the tote containing the product.

In some embodiments, one or more processors 307 may be configured to store a stowing error associated with an inbound product in database 304. For example, when one or more processors 307 receives a notification of a stowing error from user device 306, one or more processors 307 may modify database 304 to assign the stowing error to a tote identifier associated with a tote containing the inbound product with the stowing error. As such, when the product identifier associated with the inbound product is scanned or looked up in database 304, one or more processors 307 may be configured to send a cause of the stowing error for display to a remote device. For example, one or more processors 307 may be configured to send a cause of the stowing error for display to user device 306 and/or stowing error monitoring system 301.

In some embodiments, the stowing error may comprise an overage or a shortage. For example, when a physical quantity of an inbound product is less than an expected quantity of the inbound product, the stowing error may comprise a shortage. In some embodiments, when a physical quantity of an inbound product is greater than an expected quantity of the inbound product, the stowing error may comprise an overage. An expected quantity of the inbound product, for example, may be a virtual inventory of the inbound product. In some embodiments, an expected quantity of the inbound product and/or a virtual inventory of the inbound product may be a quantity or an inventory of an inbound product that a customer is able to see on a user interface as being available for purchase. In some embodiments, one or more processors 307 may store a physical quantity of an inbound product and an expected quantity of an inbound product in database 304. The physical quantity of the inbound product may comprise, for example, a quantity of the inbound product that is stowed in FC 200. The expected quantity of the inbound product may comprise, for example, a quantity of the inbound product that is expected to be available for purchase by a customer. In some embodiments, when the stowing error comprises shortage, one or more processors 307 may be configured to request, via user device 306, a difference between the physical quantity of the inbound product and the expected quantity of the inbound product, and store the difference in database 304.

In some embodiments, when the stowing error comprises overage, one or more processors 307 may determine a cause for the overage and modify database 304 to store the cause for the overage. As discussed above, a cause for the overage may include, but is not limited to, product damage, barcode damage, or incorrect product. By way of example, when the stowing error comprises overage and the cause for overage comprises at least one of product damage or barcode damage, one or more processors 307 may be configured to provide, via user device 306, a location recommendation for transferring the product with at least one of the product damage or the barcode damage. The product with at least one of the product damage or the barcode damage may be transferred such that the stowing error can be resolved. One or more processors 307 may also request, via user device 306, a quantity of a product with a stowing error, such as a quantity of a product with product damage, a quantity of a product with barcode damage, or a quantity of incorrect products. One or more processors 307 may modify database 304 to store the quantity of products with stowing errors in each tote in database 304.

In some embodiments, database 304 may be configured to store stowing error status. By way of example, when one or more processors 307 receives a notification of a stowing error from user device 306, one or more processors 307 may send the notification of the stowing error to one or more processors 305 of stowing error monitoring system 301. One or more processors 305 may determine whether the stowing error has been resolved and modify database 304 to assign a stowing error status to each stowing error. Stowing error status may include, but not limited to, resolved, reported, tote modified, or the like. For example, if a cause for the stowing error comprises a barcode damage and if the barcode has been fixed, one or more processors 305 may modify database 304 to change the stowing error status to indicate that the stowing error has been resolved. In some embodiments, the stowing error status may indicate that the stowing error has been reported, if one or more processors 305 receives a notification of the stowing error but the stowing error has not been resolved yet. In other embodiments, the stowing error status may indicate that the tote has been modified, if one or more processors 305 determines that a cause for the stowing error comprises a barcode damage, and the barcode of a product within a tote has been fixed. Other status identifiers are possible as well.

By modifying database 304 to assign a stowing error to a tote identifier associated with a tote containing inbound products, one or more processors 307 may be configured to determine various information associated with the stowing error, as well as various information associated with the inbound product with the stowing error, by scanning or looking up the tote identifier. Such information stored in database 304 may be provided for display on remote devices, such as user device 306 and/or stowing error monitoring system 301. While various elements of server 303, such as one or more processors 307, are referenced in explaining database 304 of FIG. 6, it should be noted that various elements of stowing error monitoring system 301, such as one or more processors 305, and/or various elements of user device 306, such as one or more processors 308, may be configured to modify and store information in database 304.

Figure 7:
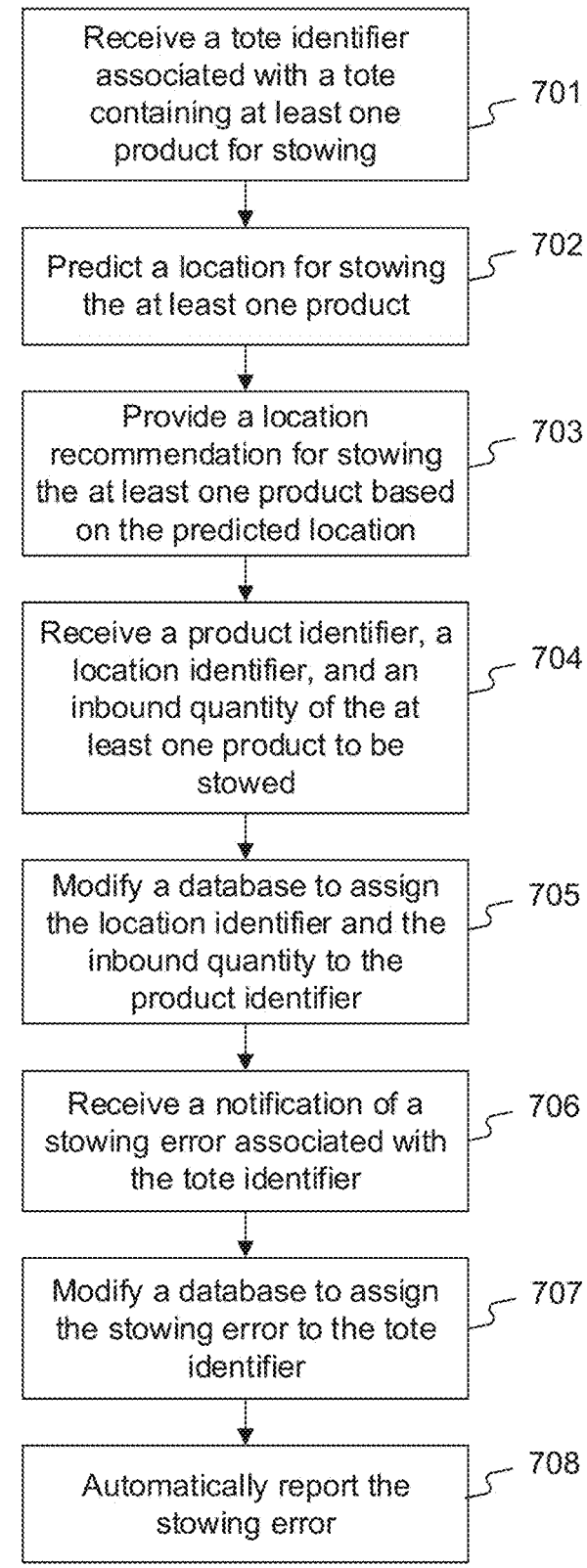
FIG. 7 is a flowchart illustrating an exemplary embodiment of a method for stowing products, consistent with the disclosed embodiments.

FIG. 7 is a flow chart illustrating an exemplary method 700 for stowing products. This exemplary method is provided by way of example. Method 700 shown in FIG. 7 can be executed or otherwise performed by one or more combinations of various systems. Method 700 as described below may be carried out by stowing error monitoring system 301, server 303, and/or user device 306, as shown in FIG. 3, by way of example. While various elements of server 303 are referenced in explaining the method of FIG. 7, it should be noted that various elements of stowing error monitoring system 301 and/or user device 306 may carry out the method of FIG. 7. Each block shown in FIG. 7 represents one or more processes, methods, or subroutines in the exemplary method 700. Referring to FIG. 7, exemplary method 700 may begin at block 701.

At block 701, one or more processors 307 may receive, from user device 306, a tote identifier associated with a tote containing at least one inbound product for stowing. As discussed above, the tote identifier, such as tote identifier 401 or 501, may comprise a combination of letters, numbers, and/or special characters and may be unique to each tote, such that the tote identifier may identify a particular tote. At block 702, based on the tote identifier received, one or more processors 307 may predict a location for stowing the at least one product contained in the tote. By way of example, one or more processors 307 may determine a location of user device 306, from which the tote identifier was received. Then, one or more processors 307 may determine empty locations within FC 200 that is capable of receiving the at least one product for stowing. For example, one or more processors 307 may identify every empty location within FC 200 that is capable of stowing the at least one product.

Among the determined empty locations within FC 200, one or more processors 307 may select an empty location that is closest to the location of user device 306 as the location for stowing the at least one product.

Then, method 700 may proceed to block 703, at which one or more processors 307 may provide a location recommendation (e.g., location recommendation 402 or 502) for stowing the at least one product based on the predicted location at block 702. As such, one or more processors 307 may provide a location recommendation for stowing the at least one product that is closest in distance to the user of user device 306 within FC 200. While it may not be required for the user of user device 306 to follow the location recommendation, by providing a location recommendation, time spent to find an empty location within FC 200 for stowing the at least one product can be reduced. In addition, while conventional systems and methods for stowing products designate fixed locations within a fulfillment center for stowing each product, one or more processors 307 may reduce stowing time, shipment time, and, ultimately, delivery time by providing a location recommendation that is closest to the user of user device 306.

Once a location recommendation has been provided, method 700 may proceed to block 704. At block 704, one or more processors 307 may receive a product identifier (e.g., product identifier 403 or 503), a location identifier (e.g., location identifier 404 or 504), and an inbound quantity (e.g., inbound quantity 405 or 505) of the at least one product to be stowed. By way of example, after the user of user device 306 inputs a product identifier (e.g., product identifier 403 or 503), a location identifier (e.g., location identifier 404 or 504), and an inbound quantity (e.g., inbound quantity 405 or 505) of the at least one product in stowing app 400 or 500, one or more processors 308 may send the product identifier, location identifier, and inbound quantity to one or more processors 307 of server 303.

At block 705, one or more processors 307 of server 303 may modify database 304 to assign the product identifier 403 or 503 to the tote identifier 401 or 501. In addition, one or more processors 307 may modify database 304 to assign the location identifier 404 or 504 and the inbound quantity 405 or 505 to the product identifier 403 or 503. As such, when the tote identifier 401 or 501 is scanned or looked up in database 304, various information associated with products contained in the tote associated with the tote identifier 401 or 501 may be determined. For example, as seen in FIG. 6, by scanning the tote identifier 401 or 501, a user may determine products contained in the tote, inbound quantity of the products, stowing errors associated with the products, physical and expected quantity of the products, stowing error status, incorrect product quantity, and/or damage quantity. By scanning the tote identifier 401 or 501, a user may determine whether there is a stowing error associated with products contained in a particular tote and also determine a cause of the stowing error, based on information stored in database 304.

Once database 304 has been modified to assign the location identifier and the inbound quantity to the product identifier, method 700 may proceed to block 706. At block 706, one or more processors 307 may be configured to receive a notification of a stowing error associated with the tote identifier. For example, as discussed with respect to FIG. 5, the user of user device 306 may report a stowing error in stowing app 500. Then, one or more processors 308 of user device 306 may send a notification of a stowing error to one or more processors 307 of server 303 and/or one or more processors 305 of stowing error monitoring system 301. Additionally or alternatively, one or more processors 307 of server 303 may receive a notification of a stowing error from user device 306 and send the notification of the stowing error to one or more processors 305 of stowing error monitoring system 301.

As discussed above, the stowing error may comprise an overage or a shortage. For example, when a physical quantity of an inbound product is less than an expected quantity of the inbound product, the stowing error may comprise a shortage. In some embodiments, when a physical quantity of an inbound product is greater than an expected quantity of the inbound product, the stowing error may comprise an overage.

After receiving the notification of the stowing error, method 700 may proceed to block 707, at which one or more processors 307 may modify database 304 to assign the stowing error to the tote identifier, such as tote identifier 401 or 501. For example, if there is a stowing error associated with a particular product contained in a particular tote, one or more processors 307 may modify database 304 to assign the stowing error to a tote identifier associated with the particular tote containing the particular product. As such, when a user scans or looks up the tote identifier associated with the particular tote, the user can determine whether there is a stowing error associated with products contained in the particular tote and also determine a cause of the stowing error, based on information stored in database 304.

Method 700 may proceed to block 708, at which one or more processors 307 may automatically report the stowing error. By way of example, one or more processors 307 of server 303 may receive a notification of a stowing error from user device 306 and automatically send the notification of the stowing error to one or more processors 305 of stowing error monitoring system 301. As such, stowing error monitoring system 301 may be configured to monitor a real-time or near real-time status of all stowing errors that arise within FC 200. Accordingly, stowing errors may be resolved more quickly and efficiently, and thus, stowing time, shipment time, and delivery time may be reduced.

Figure 8:
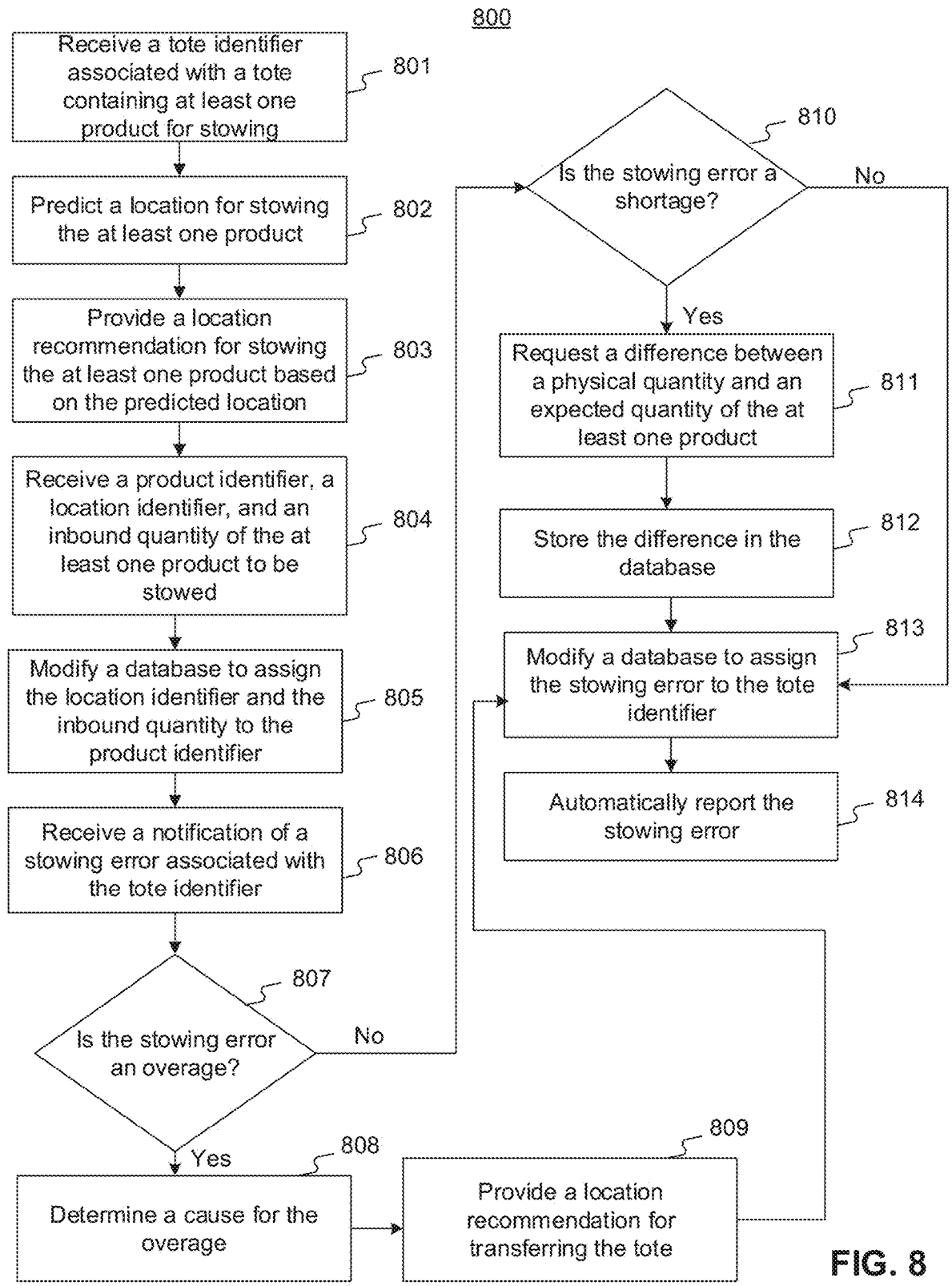
FIG. 8 is a flowchart illustrating another exemplary embodiment of a method for stowing products, consistent with the disclosed embodiments.

FIG. 8 is a flow chart illustrating an exemplary method 800 for stowing products. This exemplary method is provided by way of example. Method 800 shown in FIG. 8 can be executed or otherwise performed by one or more combinations of various systems. Method 800 as described below may be carried out by stowing error monitoring system 301, server 303, and/or user device 306, as shown in FIG. 3, by way of example. While various elements of server 303 are referenced in explaining the method of FIG. 8, it should be noted that various elements of stowing error monitoring system 301 and/or user device 306 may carry out the method of FIG. 8. Each block shown in FIG. 8 represents one or more processes, methods, or subroutines in the exemplary method 800. Referring to FIG. 8, exemplary method 800 may begin at block 801.

At block 801, one or more processors 307 may receive, from user device 306, a tote identifier associated with a tote containing at least one inbound product for stowing. As discussed above, the tote identifier, such as tote identifier 401 or 501, may comprise a combination of letters, numbers, and/or special characters and may be unique to each tote, such that the tote identifier may identify a particular tote. At block 802, based on the tote identifier received, one or more processors 307 may predict a location for stowing the at least one product contained in the tote. By way of example, one or more processors 307 may determine a location of user device 306, from which the tote identifier was received. Then, one or more processors 307 may determine empty locations within FC 200 that is capable of receiving the at least one product for stowing. For example, one or more processors 307 may identify every empty location within FC 200 that is capable of stowing the at least one product. Among the determined empty locations within FC 200, one or more processors 307 may select an empty location that is closest to the location of user device 306 as the location for stowing the at least one product. Then, method 800 may proceed to block 803, at which one or more processors 307 may provide a location recommendation (e.g., location recommendation 402 or 502) for stowing the at least one product based on the predicted location at block 802. As such, one or more processors 307 may provide a location recommendation for stowing the at least one product that is closest in distance to the user of user device 306 within FC 200. While it may not be required for the user of user device 306 to follow the location recommendation, by providing a location recommendation, time spent to find an empty location within FC 200 for stowing the at least one product can be reduced. In addition, while conventional systems and methods for stowing products designate fixed locations within a fulfillment center for stowing each product, one or more processors 307 may reduce stowing time, shipment time, and, ultimately, delivery time by providing a location recommendation that is closest to the user of user device 306.

Once a location recommendation has been provided, method 800 may proceed to block 804. At block 804, one or more processors 307 may receive a product identifier (e.g., product identifier 403 or 503), a location identifier (e.g., location identifier 404 or 504), and an inbound quantity (e.g., inbound quantity 405 or 505) of the at least one product to be stowed. By way of example, after the user of user device 306 inputs a product identifier (e.g., product identifier 403 or 503), a location identifier (e.g., location identifier 404 or 504), and an inbound quantity (e.g., inbound quantity 405 or 505) of the at least one product in stowing app 400 or 500, one or more processors 308 may send the product identifier, location identifier, and inbound quantity to one or more processors 307 of server 303.

At block 805, one or more processors 307 of server 303 may modify database 304 to assign the product identifier 403 or 503 to the tote identifier 401 or 501. In addition, one or more processors 307 may modify database 304 to assign the location identifier 404 or 504 and the inbound quantity 405 or 505 to the product identifier 403 or 503. As such, when the tote identifier 401 or 501 is scanned or looked up in database 304, various information associated with products contained in the tote associated with the tote identifier 401 or 501 may be determined. For example, as seen in FIG. 6, by scanning the tote identifier 401 or 501, a user may determine products contained in the tote, inbound quantity of the products, stowing errors associated with the products, physical and expected quantity of the products, stowing error status, incorrect product quantity, and/or damage quantity. By scanning the tote identifier 401 or 501, a user may determine whether there is a stowing error associated with products contained in a particular tote and also determine a cause of the stowing error, based on information stored in database 304.

Once database 304 has been modified to assign the location identifier and the inbound quantity to the product identifier, method 800 may proceed to block 806. At block 806, one or more processors 307 may be configured to receive a notification of a stowing error associated with the tote identifier. For example, as discussed with respect to FIG. 5, the user of user device 306 may report a stowing error in stowing app 500. Then, one or more processors 308 of user device 306 may send a notification of a stowing error to one or more processors 307 of server 303 and/or one or more processors 305 of stowing error monitoring system 301. Additionally or alternatively, one or more processors 307 of server 303 may receive a notification of a stowing error from user device 306 and send the notification of the stowing error to one or more processors 305 of stowing error monitoring system 301.

After receiving the notification of the stowing error, method 800 may proceed to block 807. At block 807, one or more processors 307 may determine whether the stowing error comprises an overage or a shortage. As discussed above, the stowing error may comprise an overage or a shortage. For example, when a physical quantity of an inbound product is less than an expected quantity of the inbound product, the stowing error may comprise a shortage. In some embodiments, when a physical quantity of an inbound product is greater than an expected quantity of the inbound product, the stowing error may comprise an overage.

At block 807, if one or more processors 307 determine that the stowing error comprises an overage, method 800 may proceed to block 808. At block 808, when the stowing error comprises an overage, one or more processors 307 may determine a cause for the overage and modify database 304 to store the cause for the overage. As discussed above, a cause for the overage may include, but is not limited to, product damage, barcode damage, or incorrect product. As discussed above with respect to FIG. 5C, the user may report a stowing error and a cause of the stowing error using stowing app 500. Then, one or more processors 308 of user device 306 may send a cause of the stowing error to one or more processors 307 of server 303.

After determining the cause for the overage, method 800 may proceed to block 809. At block 809, one or more processors may provide, via user device 306, a location recommendation for transferring the tote containing the at least one product with the stowing error such that the stowing error can be resolved. In some embodiments, the location for transferring the tote may be based on the stowing error and the cause for the stowing error. For example, if the stowing error comprises an overage, one or more processors 307 may recommend a first location for transferring the tote. If the stowing error comprises a shortage, one or more processors 307 may recommend a second location for transferring the tote. Additionally or alternatively, depending on the cause for the stowing error, one or more processors 307 may recommend a different location for transferring the tote such that the stowing error may be resolved.

After providing a location recommendation for transferring the tote, method 800 may proceed to block 813, at which one or more processors 307 may modify database 304 to assign the stowing error and/or the cause of the stowing error to a corresponding tote identifier. For example, if there is a stowing error associated with a particular product contained in a particular tote, one or more processors 307 may modify database 304 to assign the stowing error to a tote identifier associated with the particular tote containing the particular product. As such, when a user scans or looks up the tote identifier associated with the particular tote, the user can determine whether there is a stowing error associated with products contained in the particular tote and also determine a cause of the stowing error, based on information stored in database 304.

Method 800 may proceed to block 814, at which one or more processors 307 may automatically report the stowing error. By way of example, one or more processors 307 of server 303 may receive a notification of a stowing error from user device 306 and automatically send the notification of the stowing error to one or more processors 305 of stowing error monitoring system 301. As such, stowing error monitoring system 301 may be configured to monitor a real-time or near real-time status of all stowing errors that arise within FC 200. Accordingly, stowing errors may be resolved more quickly and efficiently, and thus, stowing time, shipment time, and delivery time may be reduced.

Referring back to block 807, if one or more processors 307 determine that the stowing error does not comprise an overage, method 800 may proceed to block 810. At block 810, one or more processors 307 may determine whether the stowing error comprises a shortage, e.g., when a physical quantity of an inbound product is less than an expected quantity of the inbound product. At block 810, if one or more processors 307 determine that the stowing error does not comprise a shortage, method 800 may proceed to blocks 813 and 814. As discussed above, at block 813, one or more processors 307 may modify database 304 to assign the stowing error and/or the cause of the stowing error to a corresponding tote identifier. For example, if there is a stowing error associated with a particular product contained in a particular tote, one or more processors 307 may modify database 304 to assign the stowing error to a tote identifier associated with the particular tote containing the particular product. As such, when a user scans or looks up the tote identifier associated with the particular tote, the user can determine whether there is a stowing error associated with products contained in the particular tote and also determine a cause of the stowing error, based on information stored in database 304. At block 814, one or more processors 307 may automatically report the stowing error. For example, one or more processors 307 of server 303 may receive a notification of a stowing error from user device 306 and automatically send the notification of the stowing error to one or more processors 305 of stowing error monitoring system 301. As such, stowing error monitoring system 301 may be configured to monitor a real-time or near real-time status of all stowing errors that arise within FC 200. Accordingly, stowing errors may be resolved more quickly and efficiently, and thus, stowing time, shipment time, and delivery time may be reduced.

At block 810, if one or more processors 307 determine that the stowing error comprises a shortage, method 800 may proceed to block 811. At block 811, one or more processors 307 may request, via user device 306, a difference between a physical quantity and an expected quantity of the at least one product with a stowing error. By way of example, one or more processors 307 may send a request for one or more processors 308 of user device 306 and cause user device 306 to display a prompt on interface 410 or 510. The prompt may request a user of user device 306 to input a physical quantity of the at least one product with the stowing error and/or an expected quantity of the at least one product with the stowing error. The physical quantity of the inbound product may comprise, for example, a quantity of the inbound product that is stowed in FC 200. The expected quantity of the inbound product may comprise, for example, a quantity of the inbound product that is expected to be available for purchase by a customer. After receiving the input(s) from the user, one or more processors 308 may calculate a difference in the physical quantity and the expected quantity and send the difference in value to one or more processors 307.

Additionally or alternatively, one or more processors 308 may send the physical quantity and the expected quantity of the at least one product with the stowing error to one or more processors 307. One or more processors 307 may calculate the difference in the physical quantity and the expected quantity.

After determining a difference between the physical and expected quantities of the at least one product with the stowing error, method 800 may proceed to block 812. At block 812, one or more processors 307 may store the difference between the physical quantity of the product and the expected quantity of the product in database 304. For example, one or more processors 307 may modify database 304 to assign the physical quantity, the expected quantity, and/or the difference between the physical quantity and the expected quantity to the product identifier associated with the product with the stowing error. As such, when a user scans or looks up the tote identifier in database 304, the user can determine a quantity of each product associated with a product identifier that exceeds an expected quantity of each product.

After receiving the notification of the stowing error, method 800 may proceed to block 813, at which one or more processors 307 may modify database 304 to assign the stowing error to the tote identifier, such as tote identifier 401 or 501. For example, if there is a stowing error associated with a particular product contained in a particular tote, one or more processors 307 may modify database 304 to assign the stowing error to a tote identifier associated with the particular tote containing the particular product. As such, when a user scans or looks up the tote identifier associated with the particular tote, the user can determine whether there is a stowing error associated with products contained in the particular tote and also determine a cause of the stowing error, based on information stored in database 304.

Method 800 may proceed to block 814, at which one or more processors 307 may automatically report the stowing error. By way of example, one or more processors 307 of server 303 may receive a notification of a stowing error from user device 306 and automatically send the notification of the stowing error to one or more processors 305 of stowing error monitoring system 301. As such, stowing error monitoring system 301 may be configured to monitor a real-time or near real-time status of all stowing errors that arise within FC 200. Accordingly, stowing errors may be resolved more quickly and efficiently, and thus, stowing time, shipment time, and delivery time may be reduced.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for stowing products, the system comprising:
   a memory storing instructions; and
   at least one processor configured to execute the instructions to:
      receive, from a user mobile device associated with a user, a tote identifier associated with a tote containing at least one product for stowing;
      predict, based on the tote identifier, a location for stowing the at least one product contained in the tote, wherein predicting the location for stowing the at least one product contained in the tote comprises:
         receiving data from the user mobile device in one format or protocol;
         converting the received data into another format or protocol;
         determining a location of the user mobile device based on the converted data;
         determining empty locations within a fulfillment center that are capable of receiving the at least one product; and
         selecting, among the determined empty locations, an empty location closest to the location of the user mobile device as the location for stowing the at least one product;
      provide, to the user mobile device, a location recommendation for stowing the at least one product contained in the tote based on the predicted location;
      receive, from the user mobile device, a product identifier associated with the at least one product, a location identifier associated with a position in the predicted location at which the at least one product is to be stowed, and a quantity of the at least one product to be stowed;
      modify a database to assign the location identifier and the quantity to the product identifier;
      receive, from the user mobile device, a notification of a stowing error associated with the tote identifier, the stowing error comprising at least one of an overage or a shortage;
      modify the database to assign the stowing error to the tote identifier; and
      automatically report the stowing error to a remote device, wherein:
         when the stowing error comprises overage, the at least one processor is configured to execute the instructions to:
            determine a cause for the overage, the cause for the overage comprising at least one of a product damage or a barcode damage; and
            provide, via the user mobile device, a location recommendation for transferring at least one product with at least one of the product damage or the barcode damage; and
         when the stowing error comprises shortage, the at least one processor is configured to execute the instructions to:
            request, via the user mobile device, a difference between a physical quantity of the at least one product and an expected quantity of the at least one product; and
            store the difference in the database.

2. The system of claim 1, wherein the product identifier associated with the at least one product comprises a stock keeping unit (SKU) associated with the at least one product.

3. The system of claim 1, wherein, when the tote identifier is scanned, the at least one processor is further configured to execute the instructions to send a cause of the stowing error for display to the user mobile device.

4. A computer-implemented method for stowing products, the method comprising:
   receiving, by at least one processor and from a user mobile device associated with a user, a tote identifier associated with a tote containing at least one product for stowing;
   predicting, by the at least one processor and based on the tote identifier, a location for stowing the at least one product contained in the tote, wherein predicting the location for stowing the at least one product contained in the tote comprises:
      receiving, by the at least one processor, data from the user mobile device in one format or protocol;
      converting, by the at least one processor, the received data into another format or protocol;
      determining a location of the user mobile device based on the converted data;
      determining empty locations within a fulfillment center that are capable of receiving the at least one product; and
      selecting, among the determined empty locations, an empty location closest to the location of the user mobile device as the location for stowing the at least one product;
   providing, by the at least one processor and to the user mobile device, a location recommendation for stowing the at least one product contained in the tote based on the predicted location;
   receiving, by the at least one processor and from the user mobile device, a product identifier associated with the at least one product, a location identifier associated with a position in the predicted location at which the at least one product is to be stowed, and a quantity of the at least one product to be stowed;
   modifying, by the at least one processor, a database to assign the location identifier and the quantity to the product identifier;

receiving, by the at least one processor and from the user mobile device, a notification of a stowing error associated with the tote identifier;

modifying, by the at least one processor, the database to assign the stowing error to the tote identifier; and automatically reporting, by the at least one processor, the stowing error to a remote device, wherein:

when the stowing error comprises overage, the at least one processor is configured to:

determine a cause for the overage, the cause for the overage comprising at least one of a product damage or a barcode damage; and provide, via the user mobile device, a location recommendation for transferring at least one product with at least one of the product damage or the barcode damage; and when the stowing error comprises shortage, the at least one processor is configured to:

request, via the user mobile device, a difference between a physical quantity of the at least one product and an expected quantity of the at least one product; and store the difference in the database.

5. The method of claim 4, wherein the product identifier associated with the at least one product comprises a stock keeping unit (SKU) associated with the at least one product.

6. The method of claim 4, further comprising sending a cause of the stowing error for display displaying to the user mobile device.

* * * * *